(12) United States Patent
Tang et al.

(10) Patent No.: US 12,328,287 B2
(45) Date of Patent: Jun. 10, 2025

(54) BEAM SWITCHING IN INTRA-BAND NON-CONTIGUOUS CARRIER AGGREGATION

(71) Applicant: Apple Inc., Cupertino, CA (US)

(72) Inventors: Yang Tang, San Jose, CA (US); Jie Cui, Santa Clara, CA (US); Yuhan Zhou, San Diego, CA (US)

(73) Assignee: Apple Inc., Cupertino, CA (US)

( * ) Notice: Subject to any disclaimer, the term of this patent is extended or adjusted under 35 U.S.C. 154(b) by 739 days.

(21) Appl. No.: 17/293,115

(22) PCT Filed: Nov. 11, 2019

(86) PCT No.: PCT/US2019/060716
§ 371 (c)(1),
(2) Date: May 12, 2021

(87) PCT Pub. No.: WO2020/102076
PCT Pub. Date: May 22, 2020

(65) Prior Publication Data
US 2022/0014341 A1    Jan. 13, 2022

Related U.S. Application Data

(60) Provisional application No. 62/760,326, filed on Nov. 13, 2018.

(51) Int. Cl.
*H04L 5/00* (2006.01)
(52) U.S. Cl.
CPC ............ *H04L 5/0098* (2013.01); *H04L 5/001* (2013.01); *H04L 5/0023* (2013.01); *H04L 5/0085* (2013.01)

(58) Field of Classification Search
USPC ....... 370/252, 277, 278, 281, 282, 295, 328, 370/329, 330, 341, 343, 431, 436, 437,
(Continued)

(56) References Cited

U.S. PATENT DOCUMENTS

2002/0176505 A1* 11/2002 Kim ............... H04N 21/236
375/E7.137
2014/0372566 A1* 12/2014 Milne ............. G06F 16/954
709/219
(Continued)

FOREIGN PATENT DOCUMENTS

CN      108605298 A    9/2018
KR      2017-0072072 A  6/2017
(Continued)

OTHER PUBLICATIONS

Mediatek Inc., 'Impact of FR2 intra-band NCCA MRTD to UE Rx beam switch', R4-1814899, 3GPP TSG-RAN WG4 Meeting #89, Nov. 12, 2018 (Year: 2018).*
(Continued)

*Primary Examiner* — Nguyen H Ngo
(74) *Attorney, Agent, or Firm* — Sterne, Kessler, Goldstein & Fox P.L.L.C.

(57) ABSTRACT

Various embodiments herein describe solutions to issues in beam switching for intra-band non-contiguous carrier aggregation. For example, the UE may interrupt downlink communication on one or more component carriers when the UE switches the receive beam with intra-band non-contiguous carrier aggregation. Other embodiments may be described and claimed.

19 Claims, 9 Drawing Sheets

(58) Field of Classification Search
USPC .................................................. 370/465, 480
See application file for complete search history.

(56) References Cited

U.S. PATENT DOCUMENTS

| | | | |
|---|---|---|---|
| 2017/0346534 A1 | 11/2017 | Islam et al. | |
| 2018/0054824 A1 | 2/2018 | Xue et al. | |
| 2018/0139791 A1* | 5/2018 | Bai | H04L 7/0079 |
| 2019/0044602 A1* | 2/2019 | Cui | H04B 7/08 |
| 2020/0045684 A1* | 2/2020 | Futaki | H04B 7/0408 |
| 2020/0374960 A1* | 11/2020 | Deenoo | H04B 7/0695 |

FOREIGN PATENT DOCUMENTS

| | | |
|---|---|---|
| WO | WO 2017/146773 A1 | 8/2017 |
| WO | WO 2018/061293 A1 | 4/2018 |

OTHER PUBLICATIONS

International Search Report and Written Opinion of the International Searching Authority directed to related International Patent Application No. PCT/US2019/060716, mailed Apr. 9, 2020; 7 pages.

Mediatek Inc., 'Impact of FR2 intra-band NCCA MRTD to UE Rx beam switch', R4-1814899, 3GPP TSG-RAN WG4 Meeting #89, Nov. 2, 2018, section 2 and figure 1; 2 pages.

3GPP; TSG RAN; NR; Requirements for support of radio resource management (Release 15), 3GPP TS 38.133 V15.3.0, Oct. 3, 2018, section 7.6.4; 134 pages.

3GPP; TSG RAN; NR; General aspects for BS RF for NR (Release 15), 3GPP TR 38.817-02 V15.1.0, Oct. 2, 2018, section 9.10; 89 pages.

* cited by examiner

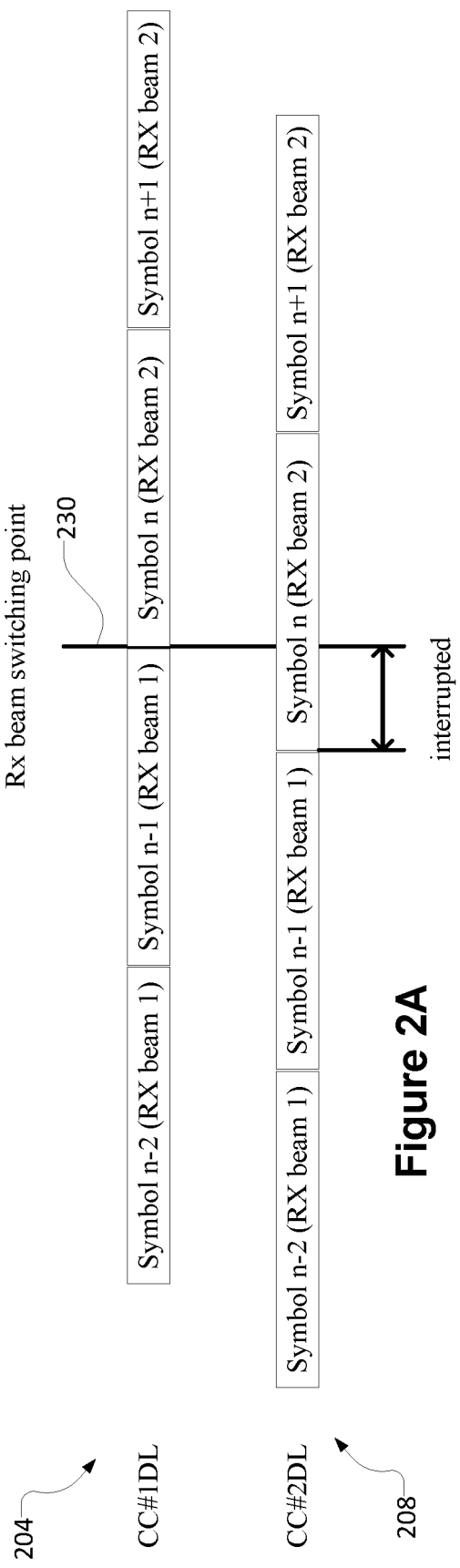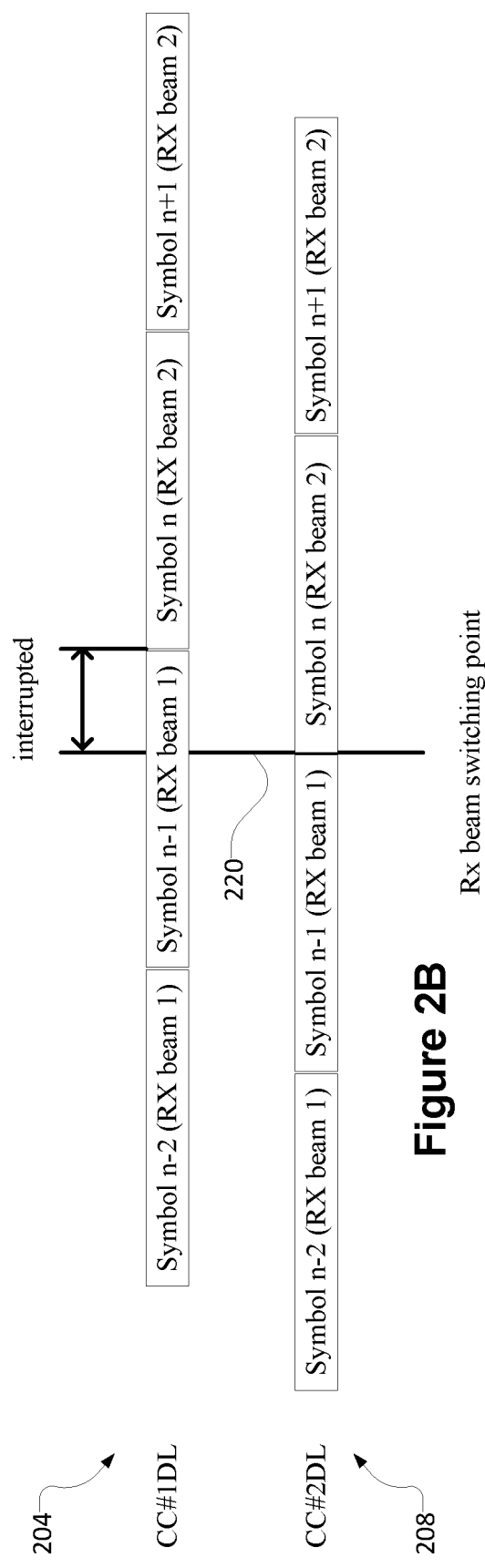

400

Encoding, for transmission to a UE, a first downlink signal on a first component carrier that is to be received by the UE contemporaneously with a second downlink signal on a second component carrier according to intra-band non-contiguous carrier aggregation, wherein the first and second downlink signals are to be received with a first receive beam
404

Switching one or more beam parameters for transmission, to the UE, of a third downlink signal on the first component carrier that is to be received by the UE contemporaneously with a fourth downlink signal on the second component carrier according to intra-band non-contiguous carrier aggregation
408

Interrupting or causing interruption of the first downlink signal or the third downlink signal based on the switch
412

Figure 4

BEAM SWITCHING IN INTRA-BAND NON-CONTIGUOUS CARRIER AGGREGATION

CROSS REFERENCE TO RELATED APPLICATION

The present application is a National Stage entry from PCT/US2019/060716 filed on Nov. 11, 2019, entitled "Beam Switching in Intra-Band Non-Contiguous Carrier Aggregation," which claims priority to U.S. Provisional Patent Application No. 62/760,326, which was filed Nov. 13, 2018, all of which are hereby incorporated by reference in their entireties.

FIELD

Embodiments of the present invention relate generally to the technical field of wireless communications.

BACKGROUND

In New Radio (NR) wireless cellular communication systems, intra-band non-continuous carrier aggregation is supported. A user equipment (UE) may support intra-band non-continuous carrier aggregation for carriers that meet a maximum receive timing difference (MRTD) requirement.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2A illustrates signals on a first component carrier and a second component carrier for intra-band non-continuous carrier aggregation when a receive beam switch is performed at a symbol boundary of the later component carrier, in accordance with various embodiments.

FIG. 2B illustrates signals on a first component carrier and a second component carrier for intra-band non-continuous carrier aggregation when a receive beam switch is performed at a symbol boundary of the earlier component carrier, in accordance with various embodiments.

FIG. 4 illustrates another operation flow/algorithmic structure in accordance with some embodiments.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Various embodiments herein provide solutions to issues in beam switching for intra-band non-contiguous carrier aggregation.

The existing maximum receive timing difference (MRTD) requirement for intra-band non-contiguous carrier aggregation (CA) may cause interruption to downlink transmission to a user equipment (UE) for subcarrier spacing (SCS) larger than 30 kHz during the receive (Rx) beam switching. This disclosure identifies the problem and proposes one or more new interruption requirements to beam switch in intra-band non-contiguous CA.

In accordance with one embodiment, the UE (e.g., UE 501a and/or 501b of FIG. 5, discussed further infra) is allowed to cause interruption to downlink (DL) transmission during Rx beam switching. This may be due to the fact that the MRTD of frequency range 2 (FR2) intra-band non-contiguous CA is larger than the cyclic prefix (CP) length of all SCSs.

The current MRTD requirement of FR2 intra-band NCCA is defined in Table 7.6.4-1 of 3GPP Technical Specification (TS) 38.133, V.15.3.0 (Oct. 3, 2018), as shown below. The requirement is 3 μs for both FR2 and Frequency Range 1 (FR1).

TABLE 7.6.4-1

Maximum receive timing difference requirement for intra-band non-contiguous NR carrier aggregation

| Frequency Range | Maximum receive timing difference (μs) |
|---|---|
| FR1 | 3 |
| FR2 | 3 |

On the other hand, the OFDM symbol and CP lengths for different SCSs are provided in Table 1. For FR2, the CP lengths are 1.17 us, 0.59 us and 0.295 us for SCS 60 KHz, 120 KHz and 240 KHz, respectively. Accordingly, the 3 μs MRTD is larger than the CP duration of SCS in FR2 band.

TABLE 1

OFDM symbol length and CP length for different SCS

| SCS (KHz) | 15 | 30 | 60 | 120 | 240 |
|---|---|---|---|---|---|
| Symbol duration (μs) | 66.66 | 33.33 | 16.67 | 8.33 | 4.16 |
| CP length (μs) | 4.96 | 2.34 | 1.17 | 0.59 | 0.295 |

Figure 1:
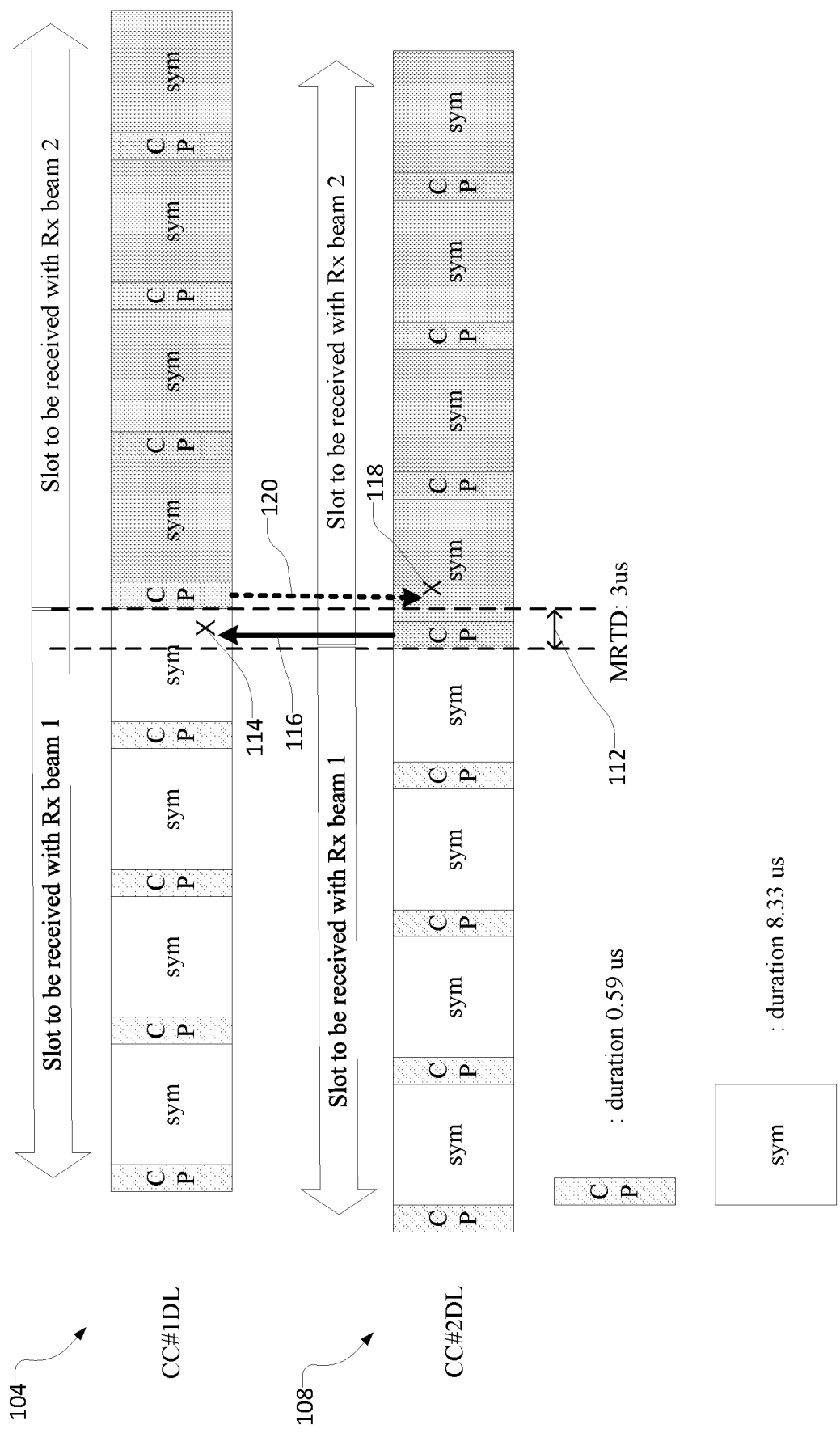
FIG. 1 illustrates signals on a first component carrier and a second component carrier for intra-band non-continuous carrier aggregation, in accordance with some embodiments.

FIG. 1 illustrates a scenario in which a UE is simultaneously receiving data on two carriers in a FR2 band (e.g., a first component carrier (CC #1) 104 and a second component carrier (CC #2) 108. The UE is indicated with a Transmission Configuration Indicator (TCI)-state #1 in slot 1 and TCI-state #2 in slot 2. After reception in slot 1, UE has to switch its Rx beam for the next slot. There is 3 μs timing misalignment between the 2 carriers, as illustrated in FIG. 1 at 112, which uses an SCS of 60 kHz as an example. In such a case, the DL transmission will be interrupted.

If UE switches its Rx beam at the symbol boundary of early carrier (e.g., CC #2 in the example shown in FIG. 1), then at least the last OFDM symbol of CC #1 (shown as 114) will be interrupted (see, e.g., arrow 116).

If UE switches its Rx beam at the symbol boundary of late carrier (e.g., CC #1 in the example shown in FIG. 1), then at least the first OFDM symbol of CC #2 (shown as 118) will be interrupted (see, e.g., arrow 120).

The frequency range 1 (FR1) and frequency range 2 (FR2) may be sets of new radio (NR) operating bands. For example, the operating bands that are included in FR1 and FR2 may be determined according to 3GPP TS 38.133, V.15.3.0 (Oct. 3, 2018). For example, grouping of operating bands to FR1 and FR2 is shown in below Tables 3.5.2-1 and/or 3.5.3-1 from TS 38.133.

TABLE 3.5.2-1

NR frequency band groups for FR1

| Group | Band group notation (NR FDD) | Operating bands | Band group notation (NR TDD) | Operating bands |
|---|---|---|---|---|
| A | NR_FDD_FR1_A | n1, n70 | NR_TDD_FR1_A | n34, n38, n39, n40, n51 |
| B | NR_FDD_FR1_B | n66 | NR_TDD_FR1_B | — |
| C | NR_FDD_FR1_C | — | NR_TDD_FR1_C | n77[1], n78, n79 |
| D | NR_FDD_FR1_D | — | NR_TDD_FR1_D | n77[2] |
| E | NR_FDD_FR1_E | n2, n7 | NR_TDD_FR1_E | n41 |
| F | NR_FDD_FR1_F | — | NR_TDD_FR1_F | — |
| G | NR_FDD_FR1_G | n3, n5, n12, n28 | NR_TDD_FR1_G | — |
| H | NR_FDD_FR1_H | n8, n25 | NR_TDD_FR1_H | — |
| I | NR_FDD_FR1_I | n20 | NR_TDD_FR1_I | — |
| J | NR_FDD_FR1_J | — | NR_TDD_FR1_J | — |
| K | NR_FDD_FR1_K | — | NR_TDD_FR1_K | — |
| L | NR_FDD_FR1_L | — | NR_TDD_FR1_L | — |
| M | NR_FDD_FR1_M | — | NR_TDD_FR1_M | — |
| N | NR_FDD_FR1_N | — | NR_TDD_FR1_N | — |
| O | NR_FDD_FR1_O | — | NR_TDD_FR1_O | — |
| P | NR_FDD_FR1_P | n71 | NR_TDD_FR1_P | — |

NOTE:
[1] Except 3.8 GHz to 4.2 GHz.
NOTE:
[2] Only 3.8 GHz to 4.2 GHz.

TABLE 3.5.3-1

NR frequency band groups for FR2

| Group | Band group notation | Operating bands |
|---|---|---|
| A | NR_TDD_FR2_A | n257[1], n258[1], n261[1] |
| B | NR_TDD_FR2_B | n257[4], n258[4], n261[4] |
| C | NR_TDD_FR2_C | — |
| D | NR_TDD_FR2_D | — |
| E | NR_TDD_FR2_E | — |
| F | NR_TDD_FR2_F | n260[4] |
| G | NR_TDD_FR2_G | n257[2], n258[2], n260[1], n261[2] |
| H | NR_TDD_FR2_H | |
| I | NR_TDD_FR2_I | |
| J | NR_TDD_FR2_J | |
| K | NR_TDD_FR2_K | |
| L | NR_TDD_FR2_L | |
| M | NR_TDD_FR2_M | |
| N | NR_TDD_FR2_N | |
| O | NR_TDD_FR2_O | |
| P | NR_TDD_FR2_P | |
| Q | NR_TDD_FR2_Q | |
| R | NR_TDD_FR2_R | |
| S | NR_TDD_FR2_S | |
| T | NR_TDD_FR2_T | n257[3], n258[3], n261[3] |
| U | NR_TDD_FR2_U | |
| V | NR_TDD_FR2_V | |
| W | NR_TDD_FR2_W | |
| X | NR_TDD_FR2_X | |
| Y | NR_TDD_FR2_Y | n260[3] |

NOTE:
[1] UE power class 1.
NOTE:
[2] UE power class 2.
NOTE:
[3] UE power class 3.
NOTE:
[4] UE power class 4.

In accordance with another embodiment, for Rx beam switching in intra-band non-contiguous CA, the UE may switch Rx beam at:

the starting boundary of the symbol, or the starting boundary of the slot, or the starting boundary of the frame of the early carrier (which is shown as CC #2 in FIG. 1); or the starting boundary of the symbol, or the starting boundary of the slot, or the starting boundary of the frame of the late carrier (which is shown as CC #1 in FIG. 1).

Accordingly, the maximum timing difference of early carrier and late carrier satisfies the MRTD requirement in TS38.133, e.g., MRTD between the two carriers is no more than 3 µs.

Given that only a single analog Rx beam is supported in intra-band CA, the UE cannot apply different beams at different carrier intra-band CA. If the receive timing difference between two carriers is larger than one CP length in each SCS, interruptions will be caused for DL transmission during beam switching in intra-band CA. The location of interruption may differ depending on the UE implementation. FIGS. 2A and 2B show two example scenarios in which the UE switches the Rx beam either at the symbol of early carrier (as shown at 220 in FIG. 2B) or at the symbol of late carrier (as shown at 230 in FIG. 2A). The resulting interruption to the other carrier is different for each of the two scenarios, as it is shown in FIGS. 2A and 2B. The granularity of beam switching at UE could be at symbol/slot/frame level, and the caused interruption duration could be one symbol, or one slot, or one frame according to different scenarios.

In accordance with another embodiment, for Rx beam switching in intra-band non-contiguous CA, If UE switches beam at starting boundary of symbol n, or slot n, or frame n of the early carrier (e.g., CC #2 208 shown in FIG. 2B), UE is allowed to interrupt symbol n−1, or slot n−1, or frame n−1 in the late carrier (e.g., CC #1 204 shown in FIG. 2B).

If UE switches beam at ending boundary of symbol n−1, or slot n−1, or frame n−1 (or at starting boundary of symbol n, or slot n, or frame n) of the late carrier (e.g., CC #1 204 shown in FIG. 2A), UE is allowed to interrupt symbol n, or slot n, or frame n in the early carrier (e.g., CC #2 208 shown in FIG. 2A).

Accordingly, the maximum timing difference of early carrier and late carrier satisfies the MRTD requirement in TS38.133, e.g., MRTD between the two carriers is no more than 3 µs.

Figure 3:
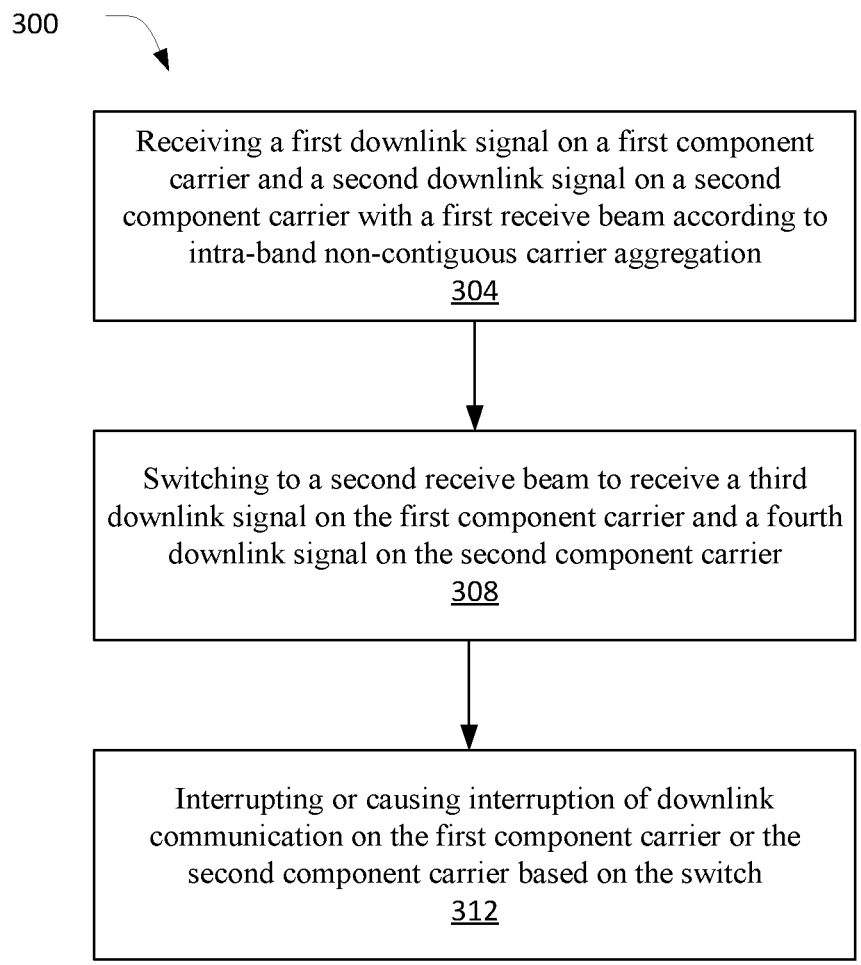
FIG. 3 illustrates an operation flow/algorithmic structure in accordance with some embodiments.

FIG. 3 illustrates an operation flow/algorithmic structure 300 in accordance with some embodiments. The operation flow/algorithmic structure 300 may be performed, in part or in whole, by a UE (e.g., UE 501a and/or 501b, discussed infra) or components thereof. For example, in some embodiments the operation flow/algorithmic structure 300 may be performed by the baseband circuitry implemented in the UE.

The operation flow/algorithmic structure 300 may include, at 304, receiving a first downlink signal on a first component carrier and a second downlink signal on a second component carrier with a first receive beam according to intra-band non-contiguous carrier aggregation. In some embodiments, the first and second component carriers may both be in NR FR2.

The operation flow/algorithmic structure 300 may further include, at 308, switching to a second receive beam to receive a third downlink signal on the first component carrier and a fourth downlink signal on the second component carrier. For example, the switching may be performed at a boundary (e.g., a symbol boundary, slot boundary, or frame boundary) of the first or second component carrier.

The operation flow/algorithmic structure 300 may further include, at 312, interrupting or causing interruption of downlink communication on the first component carrier or the second component carrier based on the switch. For example, in some embodiments, the switching may be performed at a boundary of the second component carrier. If a corresponding boundary of the first component carrier is earlier in time at the UE than the boundary of the second component carrier, then the first transmission may be interrupted (e.g., an ending symbol, slot, or frame of the first transmission). If a corresponding boundary of the first component carrier is later in time at the UE than the boundary of the second component carrier, then the third transmission may be interrupted (e.g., a beginning symbol, slot, or frame of the third transmission).

FIG. 4 illustrates an operation flow/algorithmic structure 400 in accordance with some embodiments. The operation flow/algorithmic structure 400 may be performed, in part or in whole, by a gNB (e.g., RAN node 511a and/or 511b, discussed infra) or components thereof. For example, in some embodiments the operation flow/algorithmic structure 400 may be performed by the baseband circuitry implemented in the gNB.

The operation flow/algorithmic structure 400 may include, at 404, encoding, for transmission to a UE, a first downlink signal on a first component carrier that is to be received by the UE contemporaneously with a second downlink signal on a second component carrier according to intra-band non-contiguous carrier aggregation, wherein the first and second downlink signals are to be received with a first receive beam. In some embodiments, the first and second component carriers may both be in NR FR2.

The operation flow/algorithmic structure 400 may further include, at 408, switching one or more beam parameters for transmission, to the UE, of a third downlink signal on the first component carrier that is to be received by the UE contemporaneously with a fourth downlink signal on the second component carrier according to intra-band non-contiguous carrier aggregation. The UE may, for example, switch to the second receive beam at a boundary (e.g., a symbol boundary, slot boundary, or frame boundary) of the second component carrier.

The operation flow/algorithmic structure 400 may further include, at 412, interrupting or causing interruption of the first downlink signal or the third downlink signal (on the first component carrier) based on the switch. For example, if a corresponding boundary of the first component carrier is earlier in time at the UE than the boundary of the second component carrier, then the first transmission may be interrupted (e.g., an ending symbol, slot, or frame of the first transmission). If a corresponding boundary of the first component carrier is later in time at the UE than the boundary of the second component carrier, then the third transmission may be interrupted (e.g., a beginning symbol, slot, or frame of the third transmission).

Systems and Implementations

Figure 5:
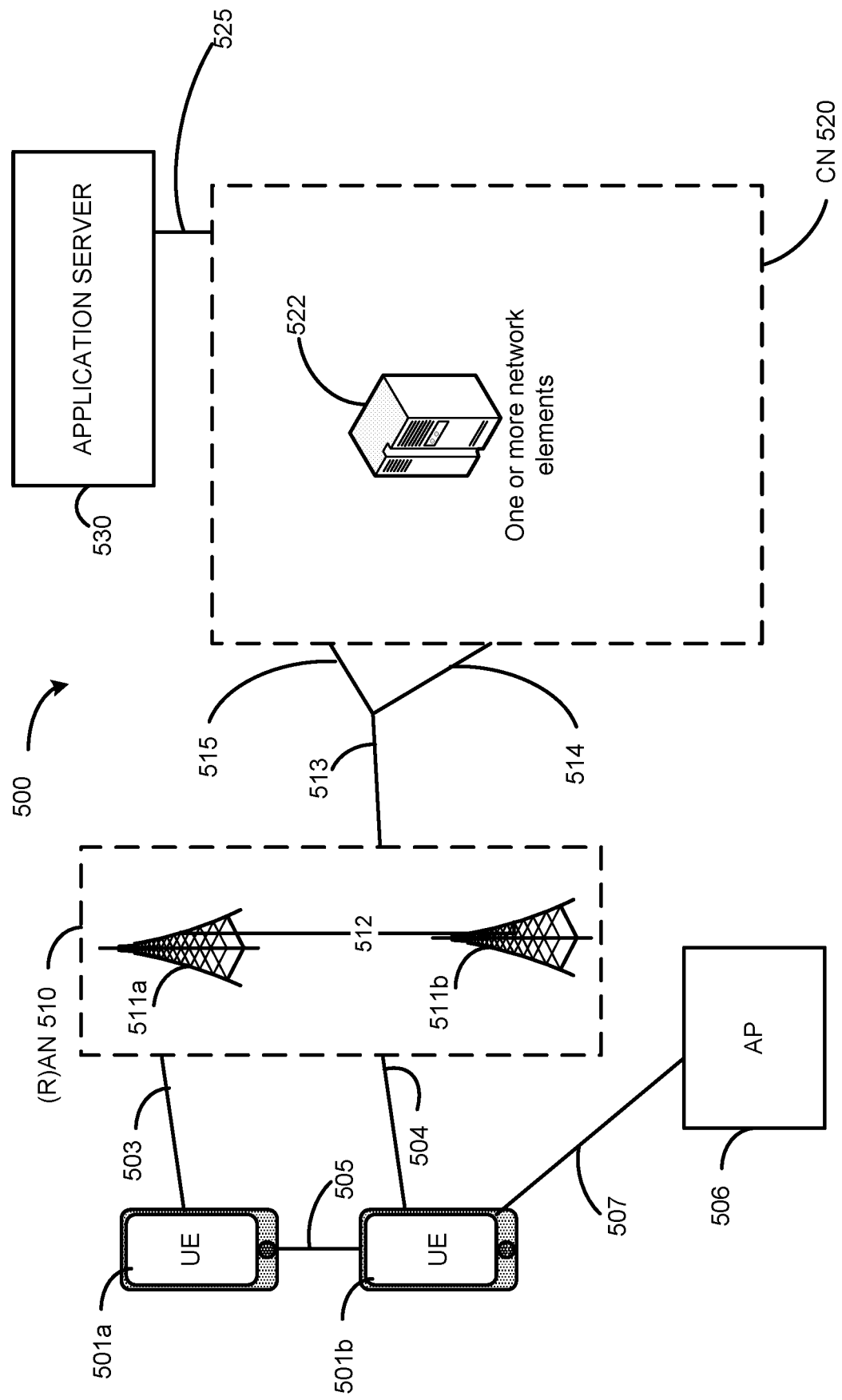
FIG. 5 illustrates an example architecture of a system of a network in accordance with various embodiments.

FIG. 5 illustrates an example architecture of a system 500 of a network, in accordance with various embodiments. The following description is provided for an example system 500 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 5, the system 500 includes UE 501*a* and UE 501*b* (collectively referred to as "UEs 501" or "UE 501"). The UE 501*a* and/or 501*b* may correspond to the UE described above. In this example, UEs 501 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 501 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 may be configured to connect, for example, communicatively couple, with an or RAN 510. In embodiments, the RAN 510 may be an NG RAN or a 5G RAN, an E-UTRAN, or a legacy RAN, such as a UTRAN or GERAN. As used herein, the term "NG RAN" or the like may refer to a RAN 510 that operates in an NR or 5G system 500, and the term "E-UTRAN" or the like may refer to a RAN 510 that operates in an LTE or 4G system 500. The UEs 501 utilize connections (or channels) 503 and 504, respectively, each of which comprises a physical communications interface or layer (discussed in further detail below).

In this example, the connections 503 and 504 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 501 may directly exchange communication data via a ProSe interface 505. The ProSe interface 505 may alternatively be referred to as a SL interface 505 and may comprise one or more logical channels, including but not limited to a PSCCH, a PSSCH, a PSDCH, and a PSBCH.

The UE 501*b* is shown to be configured to access an AP 506 (also referred to as "WLAN node 506," "WLAN 506," "WLAN Termination 506," "WT 506" or the like) via connection 507. The connection 507 can comprise a local wireless connection, such as a connection consistent with any IEEE 802.11 protocol, wherein the AP 506 would comprise a wireless fidelity (Wi-Fi®) router. In this example, the AP 506 is shown to be connected to the Internet without connecting to the core network of the wireless system (described in further detail below). In various embodiments, the UE 501*b*, RAN 510, and AP 506 may be configured to utilize LWA operation and/or LWIP operation. The LWA operation may involve the UE 501*b* in RRC_CONNECTED being configured by a RAN node 511*a*-*b* to utilize radio resources of LTE and WLAN. LWIP operation may involve the UE 501*b* using WLAN radio resources (e.g., connection 507) via IPsec protocol tunneling to authenticate and encrypt packets (e.g., IP packets) sent over the connection 507. IPsec tunneling may include encapsulating the entirety of original IP packets and adding a new packet header, thereby protecting the original header of the IP packets.

The RAN 510 can include one or more AN nodes or RAN nodes 511*a* and 511*b* (collectively referred to as "RAN nodes 511" or "RAN node 511") that enable the connections 503 and 504. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 511 that operates in an NR or 5G system 500 (for example, a gNB), and the term "E-UTRAN node" or the like may refer to a RAN node 511 that operates in an LTE or 4G system 500 (e.g., an eNB). According to various embodiments, the RAN nodes 511 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 511 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 511; a MAC/PHY split wherein RRC, PDCP, RLC, and MAC layers are operated by the CRAN/vBBUP and the PHY layer is operated by individual RAN nodes 511; or a "lower PHY" split wherein RRC, PDCP, RLC, MAC layers and upper portions of the PHY layer are operated by the CRAN/vBBUP and lower portions of the PHY layer are operated by individual RAN nodes 511. This virtualized framework allows the freed-up processor cores of the RAN nodes 511 to perform other virtualized applications. In some implementations, an individual RAN node 511 may represent individual gNB-DUs that are connected to a gNB-CU via individual F1 interfaces (not shown by FIG. 5). In these implementations, the gNB-DUs may include one or more remote radio heads or RFEMs (see, e.g., FIG. 6), and the gNB-CU may be operated by a server that is located in the RAN 510 (not shown) or by a server pool in a similar manner as the CRAN/vBBUP. Additionally or alternatively, one or more of the RAN nodes 511 may be next generation eNBs (ng-eNBs), which are RAN nodes that provide E-UTRA user plane and control plane protocol terminations toward the UEs 501, and are connected to a 5G core (5GC) via an NG interface.

In V2X scenarios one or more of the RAN nodes 511 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 501 (vUEs 501). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network. Any of the RAN nodes 511 can terminate the air interface protocol and can be the first point of contact for the UEs 501. In some embodiments, any of the RAN nodes 511 can fulfill various logical functions for the RAN 510 including, but not limited to, radio network controller (RNC) functions such as radio bearer management, uplink and downlink dynamic radio resource management and data packet scheduling, and mobility management.

In embodiments, the UEs 501 can be configured to communicate using OFDM communication signals with each other or with any of the RAN nodes 511 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 to the UEs 501, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 501, 502 and the RAN nodes 511, 512 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 501, 502 and the RAN nodes 511, 512 may operate using LAA, eLAA, and/or feLAA mechanisms. In these implementations, the UEs 501, 502 and the RAN nodes 511, 512 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 501, 502, RAN nodes 511, 512, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 501 or 502, AP 506, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 501, 502 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 501. The PDCCH carries information about the transport format and resource allocations related to the PDSCH channel, among other things. It may also inform the UEs 501 about the transport format, resource allocation, and HARQ information related to the uplink shared channel Typically, downlink scheduling (assigning control and shared channel resource blocks to the UE 501*b* within a cell) may be performed at any of the RAN nodes 511 based on channel quality information fed back from any of the UEs 501. The downlink resource assignment information may be sent on the PDCCH used for (e.g., assigned to) each of the UEs 501.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs Similar to above, each ECCE may correspond to nine sets of four physical resource elements known as EREGs. An ECCE may have other numbers of EREGs in some situations.

The RAN nodes 511 may be configured to communicate with one another via interface 512. In embodiments where the system 500 is an LTE system (e.g., when CN 520 is an EPC), the interface 512 may be an X2 interface 512. The X2 interface may be defined between two or more RAN nodes 511 (e.g., two or more eNBs and the like) that connect to EPC 520, and/or between two eNBs connecting to EPC 520. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 501 from an SeNB for user data; information of PDCP PDUs that were not delivered to a UE 501; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 500 is a 5G or NR system (e.g., when CN 520 is a 5GC), the interface 512 may be an Xn interface 512. The Xn interface is defined between two or more RAN nodes 511 (e.g., two or more gNBs and the like) that connect to 5GC 520, between a RAN node 511 (e.g., a gNB) connecting to 5GC 520 and an eNB, and/or between two eNBs connecting to 5GC 520. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 501 in a connected mode (e.g., CM-CONNECTED) including functionality to manage the UE mobility for connected mode between one or more RAN nodes 511. The mobility support may include context transfer from an old (source) serving RAN node 511 to new (target) serving RAN node 511; and control of user plane tunnels between old (source) serving RAN node 511 to new (target) serving RAN node 511. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 510 is shown to be communicatively coupled to a core network—in this embodiment, core network (CN) 520. The CN 520 may comprise a plurality of network elements 522, which are configured to offer various data and telecommunications services to customers/subscribers (e.g., users of UEs 501) who are connected to the CN 520 via the RAN 510. The components of the CN 520 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 520 may be referred to as a network slice, and a logical instantiation of a portion of the CN 520 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 530 may be an element offering applications that use IP bearer resources with the core network (e.g., UMTS PS domain, LTE PS data services, etc.). The application server 530 can also be configured to support one or more communication services (e.g., VoIP sessions, PTT sessions, group communication sessions, social networking services, etc.) for the UEs 501 via the EPC 520.

In embodiments, the CN 520 may be a 5GC (referred to as "5GC 520" or the like), and the RAN 510 may be connected with the CN 520 via an NG interface 513. In embodiments, the NG interface 513 may be split into two parts, an NG user plane (NG-U) interface 514, which carries traffic data between the RAN nodes 511 and a UPF, and the S1 control plane (NG-C) interface 515, which is a signaling interface between the RAN nodes 511 and AMFs.

In embodiments, the CN 520 may be a 5G CN (referred to as "5GC 520" or the like), while in other embodiments, the CN 520 may be an EPC). Where CN 520 is an EPC (referred to as "EPC 520" or the like), the RAN 510 may be connected with the CN 520 via an S1 interface 513. In embodiments, the S1 interface 513 may be split into two parts, an S1 user plane (S1-U) interface 514, which carries traffic data between the RAN nodes 511 and the S-GW, and the S1-MME interface 515, which is a signaling interface between the RAN nodes 511 and MMEs.

Figure 6:
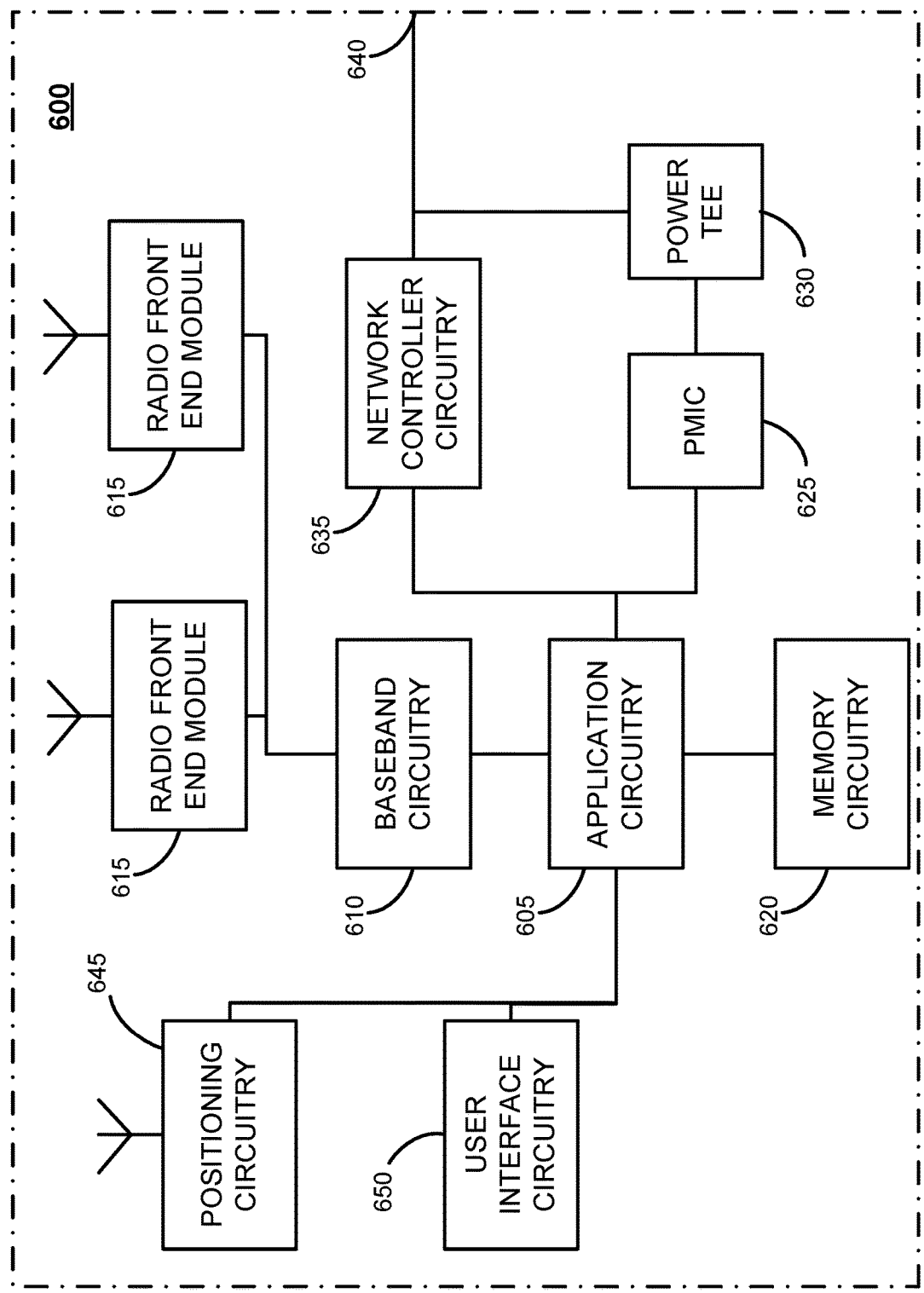
FIG. 6 illustrates an example of infrastructure equipment in accordance with various embodiments.

FIG. 6 illustrates an example of infrastructure equipment 600 in accordance with various embodiments. The infrastructure equipment 600 (or "system 600") may be implemented as a base station, radio head, RAN node such as the RAN nodes 511 and/or AP 506 shown and described previously, application server(s) 530, and/or any other element/device discussed herein. In other examples, the system 600 could be implemented in or by a UE.

The system 600 includes application circuitry 605, baseband circuitry 610, one or more radio front end modules (RFEMs) 615, memory circuitry 620, power management integrated circuitry (PMIC) 625, power tee circuitry 630, network controller circuitry 635, network interface connector 640, satellite positioning circuitry 645, and user interface 650. In some embodiments, the device 600 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 605 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 605 may be coupled with or may include memory/storage elements and may be configured to execute instructions stored in the memory/storage to enable various applications or operating systems to run on the system 600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 605 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 605 may comprise, or may be, a special-purpose processor/controller to operate according to the various embodiments herein. As examples, the processor(s) of application circuitry 605 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 600 may not utilize application circuitry 605, and instead may include a special-purpose processor/controller to process IP data received from an EPC or 5GC, for example.

In some implementations, the application circuitry 605 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 605 may comprise logic blocks or logic fabric, and other interconnected resources that may be programmed to perform various functions, such as the procedures, methods, functions, etc. of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 610 are discussed infra with regard to FIG. 8.

User interface circuitry 650 may include one or more user interfaces designed to enable user interaction with the system 600 or peripheral component interfaces designed to enable peripheral component interaction with the system 600. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 615 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 811 of FIG. 8 infra), and the RFEM may be connected to multiple antennas. In alternative implementations, both mmWave and sub-mmWave radio functions may be implemented in the same physical RFEM 615, which incorporates both mmWave antennas and sub-mmWave.

The memory circuitry 620 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 620 may be implemented as one or more of solder down packaged integrated circuits, socketed memory modules and plug-in memory cards.

The PMIC 625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 630 may provide for electrical power drawn from a network cable to provide both power supply and data connectivity to the infrastructure equipment 600 using a single cable.

The network controller circuitry 635 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 600 via network interface connector 640 using a physical connection, which may be electrical (commonly referred to as a "copper interconnect"), optical, or wireless. The network controller circuitry 635 may include one or more dedicated processors and/or FPGAs to communicate using one or more of the aforementioned protocols. In some implementations, the network controller circuitry 635 may include multiple controllers to provide connectivity to other networks using the same or different protocols.

The positioning circuitry 645 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 645 may include a Micro-Technology for Positioning, Navigation, and Timing (Micro-PNT) IC that uses a master timing clock to perform position tracking/estimation without GNSS assistance. The positioning circuitry 645 may also be part of, or interact with, the baseband circuitry 610 and/or RFEMs 615 to communicate with the nodes and components of the positioning network. The positioning circuitry 645 may also provide position data and/or time data to the application circuitry 605, which may use the data to synchronize operations with various infrastructure (e.g., RAN nodes 511, etc.), or the like.

The components shown by FIG. 6 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I²C interface, an SPI interface, point to point interfaces, and a power bus, among others.

Figure 7:
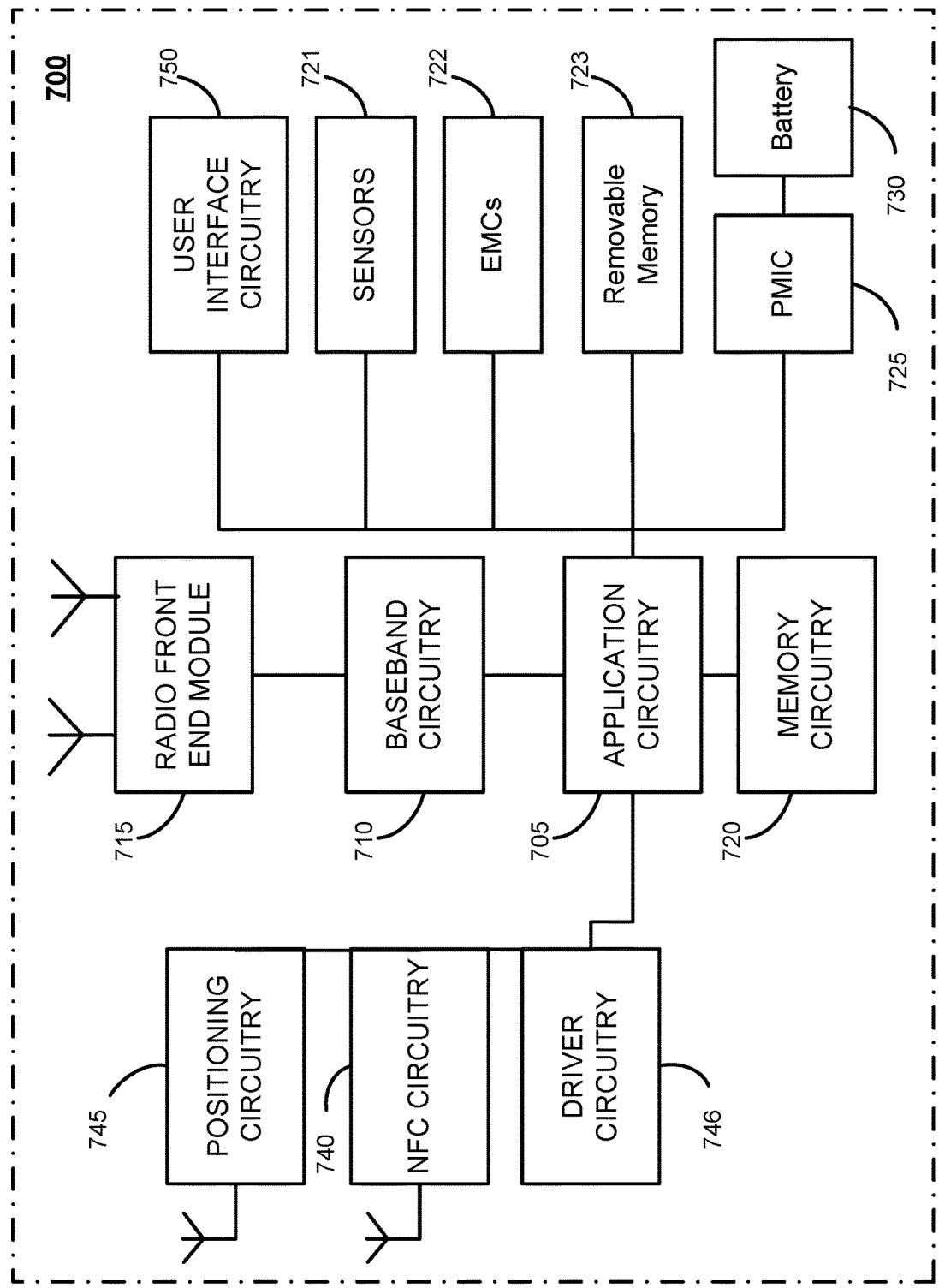
FIG. 7 depicts example components of a computer platform or device in accordance with various embodiments.

FIG. 7 illustrates an example of a platform 700 (or "device 700") in accordance with various embodiments. In embodiments, the computer platform 700 may be suitable for use as UEs 501, application servers 530, and/or any other element/device discussed herein. The platform 700 may include any combinations of the components shown in the example. The components of platform 700 may be implemented as integrated circuits (ICs), portions thereof, discrete electronic devices, or other modules, logic, hardware, software, firmware, or a combination thereof adapted in the computer platform 700, or as components otherwise incorporated within a chassis of a larger system. The block diagram of FIG. 7 is intended to show a high level view of components of the computer platform 700. However, some of the components shown may be omitted, additional components may be present, and different arrangement of the components shown may occur in other implementations.

Application circuitry 705 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 705 may be coupled with or may include memory/storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 605 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 605 may comprise, or may be, a special-purpose processor/controller to operate according to the various embodiments herein.

As examples, the processor(s) of application circuitry 705 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 705 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 705 may be a part of a system on a chip (SoC) in which the application circuitry 705 and other components are formed into a single integrated circuit, or a single package, such as the Edison™ or Galileo™ SoC boards from Intel® Corporation.

Additionally or alternatively, application circuitry 705 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 710 are discussed infra with regard to FIG. 8.

The RFEMs 715 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 811 of FIG. 8 infra), and the RFEM may be connected to multiple antennas. In alternative implementations, both mmWave and sub-mmWave radio functions may be implemented in the same physical RFEM 715, which incorporates both mmWave antennas and sub-mmWave.

The memory circuitry 720 may include any number and type of memory devices used to provide for a given amount of system memory. As examples, the memory circuitry 720 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 720 may be developed in accordance with a Joint Electron Devices Engineering Council (JEDEC) low power double data rate (LPDDR)-based design, such as LPDDR2, LPDDR3, LPDDR4, or the like. Memory circuitry 720 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 720 may be on-die memory or registers associated with the application circuitry 705. To provide for persistent storage of information such as data, applications, operating systems and so forth, memory circuitry 720 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 700 may incorporate the three-dimensional (3D) cross-point (XPOINT) memories from Intel® and Micron®.

Removable memory circuitry 723 may include devices, circuitry, enclosures/housings, ports or receptacles, etc. used to couple portable data storage devices with the platform 700. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 700 may also include interface circuitry (not shown) that is used to connect external devices with the platform 700. The external devices connected to the platform 700 via the interface circuitry include sensor circuitry 721 and electro-mechanical components (EMCs) 722, as well as removable memory devices coupled to removable memory circuitry 723.

The sensor circuitry 721 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 722 include devices, modules, or subsystems whose purpose is to enable platform 700 to change its state, position, and/or orientation, or move or control a mechanism or (sub)system. Additionally, EMCs 722 may be configured to generate and send messages/signalling to other components of the platform 700 to indicate a current state of the EMCs 722. Examples of the EMCs 722 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 700 is configured to operate one or more EMCs 722 based on one or more captured events and/or instructions or control signals received from a service provider and/or various clients.

In some implementations, the interface circuitry may connect the platform 700 with positioning circuitry 745. The positioning circuitry 745 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 745 may include a Micro-PNT IC that uses a master timing clock to perform position tracking/estimation without GNSS assistance. The positioning circuitry 745 may also be part of, or interact with, the baseband circuitry 610 and/or RFEMs 715 to communicate with the nodes and components of the positioning network. The positioning circuitry 745 may also provide position data and/or time data to the application circuitry 705, which may use the data to synchronize operations with various infrastructure (e.g., radio base stations), for turn-by-turn navigation applications, or the like In some implementations, the interface circuitry may connect the platform 700 with Near-Field Communication (NFC) circuitry 740. NFC circuitry 740 is configured to provide contactless, short-range communications based on radio frequency identification (RFID) standards, wherein magnetic field induction is used to enable communication between NFC circuitry 740 and NFC-enabled devices external to the platform 700 (e.g., an "NFC touchpoint"). NFC circuitry 740 comprises an NFC controller coupled with an antenna element and a processor coupled with the NFC controller. The NFC controller may be a chip/IC providing NFC functionalities to the NFC circuitry 740 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 740, or initiate data transfer between the NFC circuitry 740 and another active NFC device (e.g., a smartphone or an NFC-enabled POS terminal) that is proximate to the platform 700.

The driver circuitry 746 may include software and hardware elements that operate to control particular devices that are embedded in the platform 700, attached to the platform 700, or otherwise communicatively coupled with the platform 700. The driver circuitry 746 may include individual drivers allowing other components of the platform 700 to interact with or control various input/output (I/O) devices that may be present within, or connected to, the platform 700. For example, driver circuitry 746 may include a display driver to control and allow access to a display device, a touchscreen driver to control and allow access to a touchscreen interface of the platform 700, sensor drivers to obtain sensor readings of sensor circuitry 721 and control and allow access to sensor circuitry 721, EMC drivers to obtain actuator positions of the EMCs 722 and/or control and allow access to the EMCs 722, a camera driver to control and allow access to an embedded image capture device, audio drivers to control and allow access to one or more audio devices.

The power management integrated circuitry (PMIC) 725 (also referred to as "power management circuitry 725") may manage power provided to various components of the platform 700. In particular, with respect to the baseband circuitry 710, the PMIC 725 may control power-source selection, voltage scaling, battery charging, or DC-to-DC conversion. The PMIC 725 may often be included when the platform 700 is capable of being powered by a battery 730, for example, when the device is included in a UE 501.

In some embodiments, the PMIC 725 may control, or otherwise be part of, various power saving mechanisms of the platform 700. For example, if the platform 700 is in an RRC_Connected state, where it is still connected to the RAN node as it expects to receive traffic shortly, then it may enter a state known as Discontinuous Reception Mode (DRX) after a period of inactivity. During this state, the platform 700 may power down for brief intervals of time and thus save power. If there is no data traffic activity for an extended period of time, then the platform 700 may transition off to an RRC_Idle state, where it disconnects from the network and does not perform operations such as channel quality feedback, handover, etc. The platform 700 goes into a very low power state and it performs paging where again it periodically wakes up to listen to the network and then powers down again. The platform 700 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 730 may power the platform 700, although in some examples the platform 700 may be mounted deployed in a fixed location, and may have a power supply coupled to an electrical grid. The battery 730 may be a lithium ion battery, a metal-air battery, such as a zinc-air battery, an aluminum-air battery, a lithium-air battery, and the like. In some implementations, such as in V2X applications, the battery 730 may be a typical lead-acid automotive battery.

In some implementations, the battery 730 may be a "smart battery," which includes or is coupled with a Battery Management System (BMS) or battery monitoring integrated circuitry. The BMS may be included in the platform 700 to track the state of charge (SoCh) of the battery 730. The BMS may be used to monitor other parameters of the battery 730 to provide failure predictions, such as the state of health (SoH) and the state of function (SoF) of the battery 730. The BMS may communicate the information of the battery 730 to the application circuitry 705 or other components of the platform 700. The BMS may also include an analog-to-digital (ADC) convertor that allows the application circuitry 705 to directly monitor the voltage of the battery 730 or the current flow from the battery 730. The battery parameters may be used to determine actions that the platform 700 may perform, such as transmission frequency, network operation, sensing frequency, and the like.

A power block, or other power supply coupled to an electrical grid may be coupled with the BMS to charge the battery 730. In some examples, the power block may be replaced with a wireless power receiver to obtain the power wirelessly, for example, through a loop antenna in the computer platform 700. In these examples, a wireless battery charging circuit may be included in the BMS. The specific charging circuits chosen may depend on the size of the battery 730, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 750 includes various input/output (I/O) devices present within, or connected to, the platform 700, and includes one or more user interfaces designed to enable user interaction with the platform 700 and/or peripheral component interfaces designed to enable peripheral component interaction with the platform 700. The user interface circuitry 750 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 700. The output device circuitry may also include speakers or other audio emitting devices, printer(s), and/or the like. In some embodiments, the sensor circuitry 721 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 700 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 8:
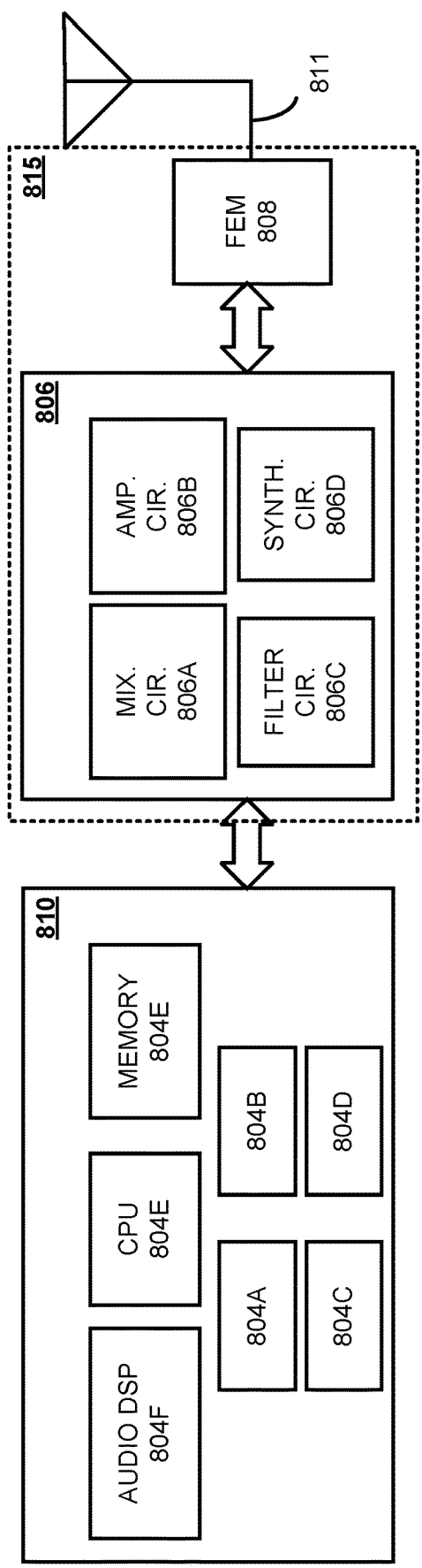
FIG. 8 depicts example components of baseband circuitry and radio frequency end modules in accordance with various embodiments.

FIG. 8 illustrates example components of baseband circuitry 810 and radio front end modules (RFEM) 815 in accordance with various embodiments. The baseband circuitry 810 corresponds to the baseband circuitry 610 and 710 of FIGS. 6 and 7, respectively. The RFEM 815 corresponds to the RFEM 615 and 715 of FIGS. 6 and 7, respectively. As shown, the RFEMs 815 may include Radio Frequency (RF) circuitry 806, front-end module (FEM) circuitry 808, antenna array 811 coupled together at least as shown.

The baseband circuitry 810 includes circuitry and/or control logic configured to carry out various radio/network protocol and radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 810 may include Fast-Fourier Transform (FFT), precoding, or constellation mapping/demapping functionality. In some embodiments, encoding/decoding circuitry of the baseband circuitry 810 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 810 is configured to process baseband signals received from a receive signal path of the RF circuitry 806 and to generate baseband signals for a transmit signal path of the RF circuitry 806. The baseband circuitry 810 is configured to interface with application circuitry 605/705 (see FIGS. 6 and 7) for generation and processing of the baseband signals and for controlling operations of the RF circuitry 806. The baseband circuitry 810 may handle various radio control functions.

The aforementioned circuitry and/or control logic of the baseband circuitry 810 may include one or more single or multi-core processors. For example, the one or more processors may include a 3G baseband processor 804A, a 4G/LTE baseband processor 804B, a 5G/NR baseband processor 804C, or some other baseband processor(s) 804D for other existing generations, generations in development or to be developed in the future (e.g., sixth generation (6G), etc.).

In other embodiments, some or all of the functionality of baseband processors 804A-D may be included in modules stored in the memory 804G and executed via a Central Processing Unit (CPU) 804E. In other embodiments, some or all of the functionality of baseband processors 804A-D may be provided as hardware accelerators (e.g., FPGAs, ASICs, etc.) loaded with the appropriate bit streams or logic blocks stored in respective memory cells. In various embodiments, the memory 804G may store program code of a real-time OS (RTOS), which when executed by the CPU 804E (or other baseband processor), is to cause the CPU 804E (or other baseband processor) to manage resources of the baseband circuitry 810, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 810 includes one or more audio digital signal processor(s) (DSP) 804F. The audio DSP(s) 804F include elements for compression/decompression and echo cancellation and may include other suitable processing elements in other embodiments.

In some embodiments, each of the processors 804A-804E include respective memory interfaces to send/receive data to/from the memory 804G. The baseband circuitry 810 may further include one or more interfaces to communicatively couple to other circuitries/devices, such as an interface to send/receive data to/from memory external to the baseband circuitry 810; an application circuitry interface to send/receive data to/from the application circuitry 605/705 of FIGS. 6-8); an RF circuitry interface to send/receive data to/from RF circuitry 806 of FIG. 8; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 725.

In alternate embodiments (which may be combined with the above described embodiments), baseband circuitry 810 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 810 may include protocol processing circuitry with one or more instances of control circuitry (not shown) to provide control functions for the digital baseband circuitry and/or radio frequency circuitry (e.g., the radio front end modules 815).

Although not shown by FIG. 8, in some embodiments, the baseband circuitry 810 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 810 and/or RF circuitry 806 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 810 and/or RF circuitry 806 are part of a Wi-Fi communication system. In the second example, the protocol processing circuitry would operate Wi-Fi MAC and logical link control (LLC) functions. The protocol processing circuitry may include one or more memory structures (e.g., 804G) to store program code and data for operating the protocol functions, as well as one or more processing cores to execute the program code and perform various operations using the data. The baseband circuitry 810 may also support radio communications for more than one wireless protocol.

The various hardware elements of the baseband circuitry 810 discussed herein may be implemented, for example, as a solder-down substrate including one or more integrated circuits (ICs), a single packaged IC soldered to a main circuit board or a multi-chip module containing two or more ICs. In one example, the components of the baseband circuitry 810 may be suitably combined in a single chip or chipset, or disposed on a same circuit board. In another example, some or all of the constituent components of the baseband circuitry 810 and RF circuitry 806 may be implemented together such as, for example, a system on a chip (SoC) or System-in-Package (SiP). In another example, some or all of the constituent components of the baseband circuitry 810 may be implemented as a separate SoC that is communicatively coupled with and RF circuitry 806 (or multiple instances of RF circuitry 806). In yet another example, some or all of the constituent components of the baseband circuitry 810 and the application circuitry 605/705 may be implemented together as individual SoCs mounted to a same circuit board (e.g., a "multi-chip package").

In some embodiments, the baseband circuitry 810 may provide for communication compatible with one or more radio technologies. For example, in some embodiments, the baseband circuitry 810 may support communication with an E-UTRAN or other WMAN, a WLAN, a WPAN. Embodiments in which the baseband circuitry 810 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path, which may include circuitry to down-convert RF signals received from the FEM circuitry 808 and provide baseband signals to the baseband circuitry 810. RF circuitry 806 may also include a transmit signal path, which may include circuitry to up-convert baseband signals provided by the baseband circuitry 810 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 810 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 810 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a of the transmit signal path may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 810 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 810 or the application circuitry 605/705 depending on the desired output frequency. In some embodiments, a divider control input (e.g., N) may be determined from a look-up table based on a channel indicated by the application circuitry 605/705.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path, which may include circuitry configured to operate on RF signals received from antenna array 811, amplify the received signals and provide the amplified versions of the received signals to the RF circuitry 806 for further processing. FEM circuitry 808 may also include a transmit signal path, which may include circuitry configured to amplify signals for transmission provided by the RF circuitry 806 for transmission by one or more of antenna elements of antenna array 811. In various embodiments, the amplification through the transmit or receive signal paths may be done solely in the RF circuitry 806, solely in the FEM circuitry 808, or in both the RF circuitry 806 and the FEM circuitry 808.

In some embodiments, the FEM circuitry 808 may include a TX/RX switch to switch between transmit mode and receive mode operation. The FEM circuitry 808 may include a receive signal path and a transmit signal path. The receive signal path of the FEM circuitry 808 may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission by one or more antenna elements of the antenna array 811.

The antenna array 811 comprises one or more antenna elements, each of which is configured convert electrical signals into radio waves to travel through the air and to convert received radio waves into electrical signals. For example, digital baseband signals provided by the baseband circuitry 810 is converted into analog RF signals (e.g., modulated waveform) that will be amplified and transmitted via the antenna elements of the antenna array 811 including one or more antenna elements (not shown). The antenna elements may be omnidirectional, direction, or a combination thereof. The antenna elements may be formed in a multitude of arranges as are known and/or discussed herein. The antenna array 811 may comprise microstrip antennas or printed antennas that are fabricated on the surface of one or more printed circuit boards. The antenna array 811 may be formed in as a patch of metal foil (e.g., a patch antenna) in a variety of shapes, and may be coupled with the RF circuitry 806 and/or FEM circuitry 808 using metal transmission lines or the like.

Processors of the application circuitry 605/705 and processors of the baseband circuitry 810 may be used to execute elements of one or more instances of a protocol stack. For example, processors of the baseband circuitry 810, alone or in combination, may be used execute Layer 3, Layer 2, or Layer 1 functionality, while processors of the application circuitry 605/705 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 9:
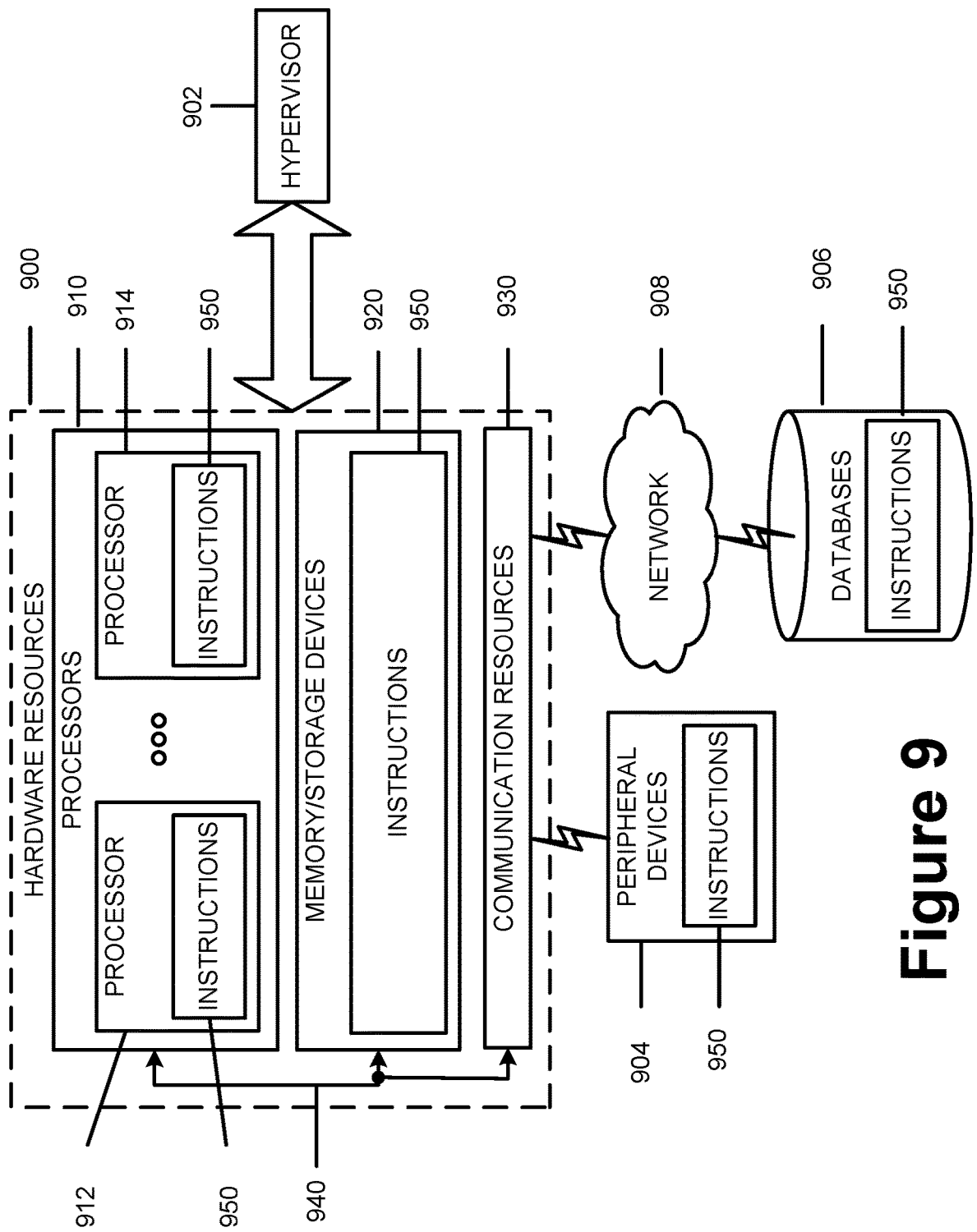
FIG. 9 is a block diagram illustrating components, according to some example embodiments, able to read instructions from a machine-readable or computer-readable medium (for example, a non-transitory machine-readable storage medium) and perform any one or more of the methodologies discussed herein.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. For embodiments where node virtualization (e.g., NFV) is utilized, a hypervisor 902 may be executed to provide an execution environment for one or more network slices/sub-slices to utilize the hardware resources 900.

The processors 910 may include, for example, a processor 912 and a processor 914. The processor(s) 910 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 920 may include main memory, disk storage, or any suitable combination thereof. The memory/storage devices 920 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via USB), cellular communication components, NFC components, Bluetooth® (or Bluetooth® Low Energy) components, Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

Some non-limiting Examples of various embodiments are provided below.

Example 1 is one or more computer-readable media (CRM) having instructions, stored thereon, that when executed by one or more processors cause a user equipment (UE) to: receive a first downlink signal on a first component carrier and a second downlink signal on a second component carrier with a first receive beam according to intra-band non-contiguous carrier aggregation; switch to a second receive beam to receive a third downlink signal on the first component carrier and a fourth downlink signal on the second component carrier; and interrupt or cause interruption of downlink communication on the first component carrier or the second component carrier based on the switch.

Example 2 is the one or more CRM of Example 1, wherein a first timing of the first component carrier is misaligned with a second timing of the second component carrier within a minimum receive time difference (MRTD).

Example 3 is the one or more CRM of Example 1, wherein the switch to the second receive beam is performed at a boundary of a first selected one of the first or second component carrier that has an earlier timing, and wherein the downlink communication is interrupted on a second selected one of the first or second component carrier that has a later timing.

Example 4 is the one or more CRM of Example 3, wherein: the boundary is a starting boundary of a symbol n of the first selected one, and wherein the downlink communication is interrupted on a symbol n−1 of the second selected one; or wherein the boundary is a starting boundary of a slot n of the first selected one, and wherein the downlink communication is interrupted on a slot n−1 of the second selected one; or wherein the boundary is a starting boundary of a frame n of the first selected one, and wherein the downlink communication is interrupted on a frame n−1 of the second selected one.

Example 5 is the one or more CRM of Example 1, wherein the switch to the second receive beam is performed at a boundary of a first selected one of the first or second component carrier that has a later timing, and wherein the downlink communication is interrupted on a second selected one of the first or second component carrier that has an earlier timing.

Example 6 is the one or more CRM of Example 5, wherein: the boundary is an ending boundary of a symbol n−1 of the first selected one, and wherein the downlink communication is interrupted on a symbol n of the second selected one; or wherein the boundary is an ending boundary of a slot n−1 of the first selected one, and wherein the downlink communication is interrupted on a slot n of the second selected one; or wherein the boundary is an ending boundary of a frame n of the first selected one, and wherein the downlink communication is interrupted on a frame n of the second selected one.

Example 7 is the one or more CRM of Example 1, wherein the switch to the second receive beam is performed at a symbol boundary, a slot boundary, or a frame boundary of the first or second component carrier.

Example 8 is the one or more CRM of Example 1, wherein the downlink communication is interrupted for a symbol, a slot, or a frame of the first component carrier or the second component carrier.

Example 9 is the one or more CRM of any one of Examples 1-8, wherein the first and second component carriers are included in a New Radio (NR) Frequency Range 2 (FR2).

Example 10 is one or more computer-readable media (CRM) having instructions, stored thereon, that when executed by one or more processors cause a next generation base station (gNB) to: encode, for transmission to a user equipment (UE), a first downlink signal on a first component carrier that is to be received by the UE contemporaneously with a second downlink signal on a second component carrier according to intra-band non-contiguous carrier aggregation, wherein the first and second downlink signals are to be received with a first receive beam; switch one or more beam parameters for transmission, to the UE, of a third downlink signal on the first component carrier that is to be received by the UE contemporaneously with a fourth downlink signal on the second component carrier according to intra-band non-contiguous carrier aggregation; and interrupt or cause interruption of the first downlink signal or the third downlink signal based on the switch.

Example 11 is the one or more CRM of Example 10, wherein a first receive timing of the first component carrier is misaligned with a second receive timing of the second component carrier within a minimum receive time difference (MRTD).

Example 12 is the one or more CRM of Example 10, wherein the UE is to switch to the second receive beam at a boundary of the second component carrier.

Example 13 is the one or more CRM of Example 12, wherein a corresponding boundary of the first component carrier is earlier in time at the UE than the boundary of the second component carrier, and wherein the first transmission is interrupted.

Example 14 is the one or more CRM of Example 12, wherein a corresponding boundary of the first component carrier is later in time at the UE than the boundary of the second component carrier, and wherein the third transmission is interrupted.

Example 15 is the one or more CRM of Example 12, wherein the boundary of the second component carrier is a symbol boundary, a slot boundary, or a frame boundary.

Example 16 is the one or more CRM of Example 10, wherein the downlink communication is interrupted for a symbol, a slot, or a frame of the first component carrier.

Example 17 is the one or more CRM of any one of Examples 10-16, wherein the first and second component carriers are included in a New Radio (NR) Frequency Range 2 (FR2).

Example 18 is an apparatus to be implemented in a user equipment (UE), the apparatus comprising: a memory to store configuration information for a first component carrier and a second component carrier for intra-band non-contiguous carrier aggregation; and a processor coupled to the memory. The processor is to: control the UE to use a first receive beam to contemporaneously receive a first downlink signal on the first component carrier and a second downlink signal on the second component carrier; control the UE to switch, at a boundary of the second component carrier, to a second receive beam to contemporaneously receive a third downlink signal on the first component carrier and a fourth downlink signal on the second component carrier; and interrupt or cause interruption of the first downlink signal or the third downlink signal on the first component carrier on the switch to the second receive beam.

Example 19 is the apparatus of Example 18, wherein a corresponding boundary of the first component carrier is earlier in time at the UE than the boundary of the second component carrier, and wherein the first transmission is interrupted.

Example 20 is the apparatus of Example 18, wherein a corresponding boundary of the first component carrier is later in time at the UE than the boundary of the second component carrier, and wherein the third transmission is interrupted.

Example 21 is the apparatus of Example 18, wherein the boundary of the second component carrier is a symbol boundary, a slot boundary, or a frame boundary.

Example 22 is the apparatus of Example 18, wherein the downlink communication is interrupted for a symbol, a slot, or a frame on the first component carrier.

Example 23 is the apparatus of any one of Examples 18-22, wherein the first and second component carriers are in a New Radio (NR) Frequency Range 2 (FR2).

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A non-transitory computer-readable medium (CRM) having instructions, stored thereon, that when executed by one or more processors cause a user equipment (UE) to perform operations, the operations comprising:
receiving a first downlink signal on a first component carrier and a second downlink signal on a second component carrier with a first receive beam according to intra-band non-contiguous carrier aggregation;
switching to a second receive beam to receive a third downlink signal on the first component carrier and a fourth downlink signal on the second component carrier at a slot boundary or a frame boundary of the first or second component carrier; and
interrupting or causing interruption of downlink communication on the first component carrier or the second component carrier based on the switch.

2. The non-transitory CRM of claim 1, wherein a first timing of the first component carrier is misaligned with a second timing of the second component carrier within a minimum receive time difference (MRTD).

3. The non-transitory CRM of claim 1, wherein the switching to the second receive beam is performed at a boundary of a first selected one of the first or second component carrier that has an earlier timing, and wherein the downlink communication is interrupted on a second selected one of the first or second component carrier that has a later timing.

4. The non-transitory CRM of claim 3,
wherein the boundary is a starting boundary of a slot n of the first selected one, and wherein the downlink communication is interrupted on a slot n–1 of the second selected one; or
wherein the boundary is a starting boundary of a frame n of the first selected one, and wherein the downlink communication is interrupted on a frame n–1 of the second selected one.

5. The non-transitory CRM of claim 1, wherein the switching to the second receive beam is performed at a boundary of a first selected one of the first or second component carrier that has a later timing, and wherein the downlink communication is interrupted on a second selected one of the first or second component carrier that has an earlier timing.

6. The non-transitory CRM of claim 5,
wherein the boundary is an ending boundary of a slot n–1 of the first selected one, and wherein the downlink communication is interrupted on a slot n of the second selected one; or
wherein the boundary is an ending boundary of a frame n of the first selected one, and wherein the downlink communication is interrupted on a frame n of the second selected one.

7. The non-transitory CRM of claim 1, wherein the downlink communication is interrupted for a slot or a frame of the first component carrier or the second component carrier.

8. The non-transitory CRM of claim 1, wherein the first and second component carriers are included in a New Radio (NR) Frequency Range 2 (FR2).

9. A non-transitory computer-readable medium (CRM) having instructions, stored thereon, that when executed by one or more processors cause a base station (BS) to perform operations, the operations comprising:
encoding, for transmission to a user equipment (UE), a first downlink signal on a first component carrier that is to be received by the UE contemporaneously with a second downlink signal on a second component carrier according to intra-band non-contiguous carrier aggregation, wherein the first and second downlink signals are to be received with a first receive beam;
switching one or more beam parameters for the transmission, to the UE, of a third downlink signal on the first component carrier that is to be received by the UE contemporaneously with a fourth downlink signal on the second component carrier according to the intra-band non-contiguous carrier aggregation at a slot boundary or a frame boundary of the first or second component carrier; and
interrupting or causing interruption of the first downlink signal or the third downlink signal based on the switch.

10. The non-transitory CRM of claim 9, wherein a first receive timing of the first component carrier is misaligned with a second receive timing of the second component carrier within a minimum receive time difference (MRTD).

11. The non-transitory CRM of claim 9, wherein the UE is to switch to a second receive beam at a boundary of the second component carrier.

12. The non-transitory CRM of claim 11, wherein a corresponding boundary of the first component carrier is earlier in time at the UE than the boundary of the second component carrier, and wherein a first transmission is interrupted.

13. The non-transitory CRM of claim 11, wherein a corresponding boundary of the first component carrier is later in time at the UE than the boundary of the second component carrier, and wherein a third transmission is interrupted.

14. The non-transitory CRM of claim 11, wherein the boundary of the second component carrier is a slot boundary or a frame boundary.

15. The non-transitory CRM of claim 9, wherein the downlink communication is interrupted for a slot or a frame of the first component carrier.

16. The non-transitory CRM of claim 9, wherein the first and second component carriers are included in a New Radio (NR) Frequency Range 2 (FR2).

17. A user equipment (UE) comprising:
a memory to store configuration information for a first component carrier and a second component carrier for intra-band non-contiguous carrier aggregation;
a processor coupled to the memory, the processor configured to:
control the UE to use a first receive beam to contemporaneously receive a first downlink signal on the first component carrier and a second downlink signal on the second component carrier;
control the UE to switch, at a boundary of the second component carrier, to a second receive beam to contemporaneously receive a third downlink signal on the first component carrier and a fourth downlink signal on the second component carrier; and
interrupt or cause interruption of the first downlink signal or the third downlink signal on the first component carrier on the switch to the second receive beam,
wherein the boundary of the second component carrier is a slot boundary or a frame boundary.

18. The UE of claim 17, wherein a corresponding boundary of the first component carrier is earlier in time at the UE than the boundary of the second component carrier, and wherein a first transmission is interrupted.

19. The UE of claim 17, wherein a corresponding boundary of the first component carrier is later in time at the UE than the boundary of the second component carrier, and wherein a third transmission is interrupted.

* * * * *